(12) United States Patent
Cai et al.

(10) Patent No.: US 6,191,911 B1
(45) Date of Patent: Feb. 20, 2001

(54) POSITIONING APPARATUS FOR HARD DISK SERVOWRITER

(75) Inventors: Lilong Cai, Clearwater Bay; Weidong Zhou, Staff Quarter, both of (HK)

(73) Assignee: The Hong Kong University of Science and Technology (HK)

( * ) Notice: Under 35 U.S.C. 154(b), the term of this patent shall be extended for 0 days.

(21) Appl. No.: 09/096,177

(22) Filed: Jun. 12, 1998

(51) Int. Cl.⁷ .............................. G11B 5/596; G11B 21/02
(52) U.S. Cl. .................. 360/77.03; 360/75; 360/78.11; 250/237 G
(58) Field of Search ................... 360/75, 77.03, 360/78.11; 250/237 G

(56) References Cited

U.S. PATENT DOCUMENTS

| | | | |
|---|---|---|---|
| 3,806,254 | * | 4/1974 | Ha et al. ............... 356/395 |
| 4,591,270 | * | 5/1986 | Ahlen .................. 356/333 |
| 5,091,808 | * | 2/1992 | Nigam ................. 360/78.05 |
| 5,227,625 | * | 7/1993 | Hetzler ............... 250/231.13 |
| 5,325,349 | * | 6/1994 | Taniguchi ............. 369/109 |
| 5,327,218 | * | 7/1994 | Igaki .................. 356/356 |
| 5,333,140 | | 7/1994 | Moraru et al. ........... 371/21.2 |
| 5,442,172 | * | 8/1995 | Chiang et al. .......... 250/273 G |
| 6,034,838 | * | 3/2000 | Touji et al. ........... 360/78.11 |
| 6,072,655 | * | 6/2000 | Uwabo et al. .......... 360/78.11 |

FOREIGN PATENT DOCUMENTS

401062828 * 3/1989 (JP) .................. G11B/7/085

* cited by examiner

Primary Examiner—Hoa T. Nguyen
Assistant Examiner—Dan I. Davidson
(74) Attorney, Agent, or Firm—Burns, Doane, Swecker & Mathis, L.L.P.

(57) ABSTRACT

A servowriter positioning apparatus for hard disk drives comprises an optical read head 2 for directing three focussed light beams on grating sections formed at the end of a grating member 1 connected to the servo write head(s) 3 in order to indicate the position and movement of the head(s) 3. The optical read head 2 may be based on CD or DVD technology. The servo write head(s) 3 are mounted on an actuator arm 5 to which the grating member 1 is fixed for rotation therewith and which are both driven in rotation by a rotary actuator. The grating member 1 comprises two grating sections 11,12 separated by a smooth section 13 for generating a focus error correction signal. The apparatus of the invention can be used to sense and control the position and movement of the servo write heads, or of the read/write heads of the hard disk themselves, thus eliminating the need for any servo pattern.

20 Claims, 6 Drawing Sheets

POSITIONING APPARATUS FOR HARD DISK SERVOWRITER

FIELD OF THE INVENTION

This invention relates to a servowriter positioning apparatus for use with a hard disk drive that allows the precise positioning of the servo-pattern writing heads that is required for successful servowriting. The present invention also relates to a track position sensor for providing the track position of read/write heads of a hard disk drive instead of the conventional servo-pattern.

BACKGROUND OF THE INVENTION

As the capacity and performance of hard disks continue to advance, the ability to provide higher resolution track position signals for read/write heads of a hard disk assembly (HDA) is becoming increasingly important. In order to maintain the position of the magnetic head along the center line of a desired track, servo information in the form of a magnetic servo pattern is prerecorded on the disk surfaces during the manufacture of disk drives. The device used to record the magnetic pattern is called a servowriter and of course the accuracy of the servowriter will be critical to the accuracy of the resulting servo-pattern and the accuracy of the position of the read/write heads.

Recently the data density of hard disk drives has grown by 60% per year, and for example a storage density of up to 2.7 GB per square inch with a track density of up to 13,700 TPI (tracks per inch) is commercially available from International Business Machines Corporation. It is likely that in the near future even greater densities will be available, e.g. up to 50,000 TPI. Since when servo-writing a head position accuracy within 1% of the track pitch is required, these ever greater track densities place major demands on the servowriter accuracy.

PRIOR ART

Conventionally laser-interferometry based position sensing is widely used in current servowriters. U.S. Pat. No. 5,333,140 describes a system using a two-frequency laser interferometer as a position transducer in a servo-writer as shown in FIG. 1. In this arrangement position of the drive arm carrying the servo write heads 30 is sensed through the movement of a retroreflector 31 that follows its motion. The retroreflector is mounted on an external stage 32 which pushes the servo heads along the radii direction. In this arrangement there is a delicate interface between the external stage and the drive arm, and hence the servo write heads are prone to slippage, warping and vibrations which resulting positioning errors in the servowriting and the resulting servo pattern.

FIG. 2 shows an attempt to improve this system with the retroreflector 31 attached to a rotary actuator 33 carrying the servo write heads 30. In order to avoid the problems described above with reference to U.S. Pat. No. 5,333,140 the rotary drive arm is directly set in the servo loop. However, attaching a bulky retroreflector to the mid-span of the drive arm reduces the effective position resolution by 30–50% and increases the settling time of the servo write heads.

Furthermore, although the resolution and accuracy of a laser interferometer measurement system are high, such systems are expensive, complicated and large in size. It is hard to minimize the size and costs of servo writers, and because of the long settling time of servo write heads servowriting is a time consuming job—taking about five minutes for each hard disk assembly. As a consequence hard disk manufacturers require a large number of servo writers. There is therefore a clear need for a more accurate, more compact and more economic servowriter.

Since conventional servo writers are extremely expensive and sensitive to vibration, contamination and electromagnetic interference, they must be operated on heavy granite anti-vibration tables in a clean room that is itself protected from vibration and shock. For high-volume production these requirements present considerable problems of cost and quality control. Indeed while a magnetic servo pattern is conventionally used for positioning the read/write heads in a hard disk, the servo pattern occupies up 6–10% of the usable disk space and so it would be preferable to be able to be able to do away with the need for a servo pattern at all, so providing more usable space on the disk and eliminating the need for servo-writing.

SUMMARY OF THE INVENTION

According to the present invention there is provided apparatus for sensing the position and/or movement of a servo write head of a servowriter for a hard disk assembly, comprising: a grating member, an optical read head for reading position information of said grating member, at least one servo write head fixedly connected to said grating member, and an actuator for driving together the grating member and said at least one servo write head.

Preferably the at least one servo write head is supported on an actuator arm and wherein the grating member is fixed to the actuator arm for movement therewith, the actuator arm being rotatably driven by said actuator about an axis.

In a preferred embodiment, to increase the resolution of the apparatus, the grating member has an elongate form with a grating formed at one end thereof, and the at least one servo write head is located at a position approximately midway along the grating member between the axis and the grating.

Preferably the grating member may take the form as described in detail in copending application Ser. No. 08/824,759, that is to say it may comprise two parallel reflection grating sections, each of the two sections having the same pitch but being displaced relative to each other by one eighth of the pitch. The two grating sections may be separated by a smooth section for generating a focus error correction signal. The optical read head preferably includes a laser light source and the grating sections comprise alternating lands and grooves, the grooves having a depth equal to one quarter the wavelength of the laser source.

The optical read head may take a number of forms. Preferably the optical read head comprises a laser light source, means for dividing the laser light source into three beams, means for directing the three beams onto the surface of the grating member, means for detecting the beams reflected from the grating member, and means for outputting intensity-modulated signals corresponding to the motion of the grating member.

The actuator may cause the servo write head(s) to move linearly over the hard disk, for example along a radius, and may cause the grating member to likewise move linearly. Preferably, however, the actuator is a rotary actuator adapted to cause the servo write head and the grating member to rotate about an axis, and wherein the grating sections are arcuate with a centre of curvature corresponding to the axis of rotation of the servo write head and the grating member.

The servo write head(s) may be a specially dedicated head, however preferably the read/write heads of the hard disk assembly themselves are used for writing the servo pattern.

In such a way the present invention provides a more accurate, compact and economical apparatus for the accurate servo-writing of a servo pattern onto a hard disk.

However, the servo pattern still occupies 6–10% of the usable space on a hard disk. By means of the present invention the position and movement of the read/write heads can be accurately sensed and hence controlled without the need for any servo pattern at all.

Hence according to the present invention there is further provided apparatus for sensing the position and/or movement of the read/write heads of a hard disk assembly comprising, a grating member fixedly connected to a said read/write head, an optical read head for reading position information of said grating member, and an actuator for driving together said grating member and said read/write head.

BRIEF DESCRIPTION OF THE DRAWINGS

Some embodiments of the invention will now be described by way of example and with reference to the accompanying drawings, in which:-

DETAILED DESCRIPTION OF PREFERRED EMBODIMENTS

Figure 1:
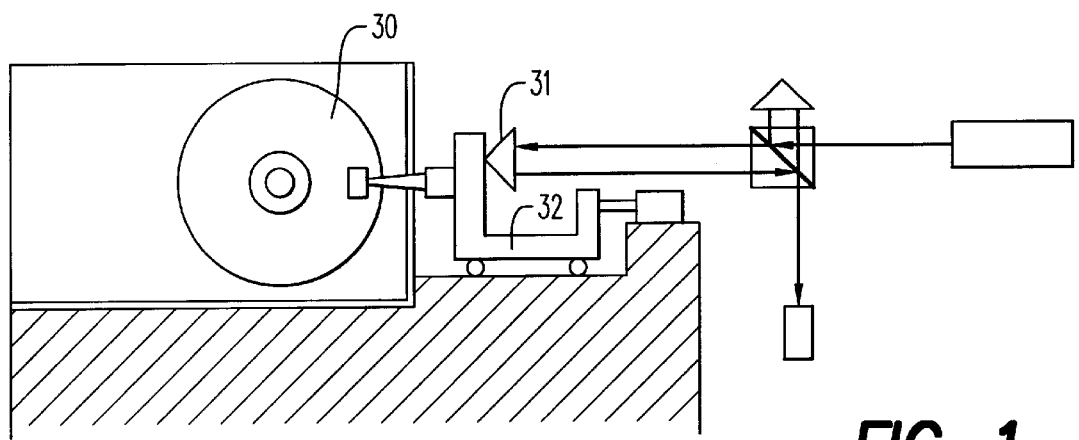
FIG. 1 shows schematically a conventional laser position system for a servowriter.
Figure 2:
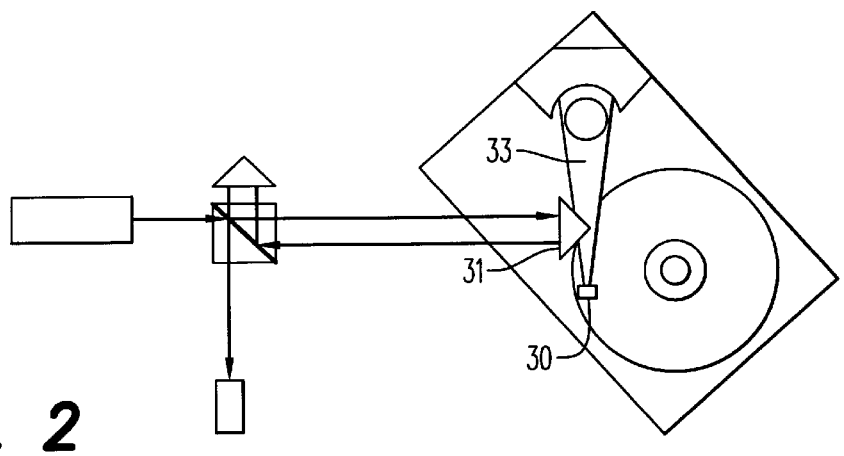
FIG. 2 shows schematically another form of conventional laser position system for a servowriter.
Figure 3:
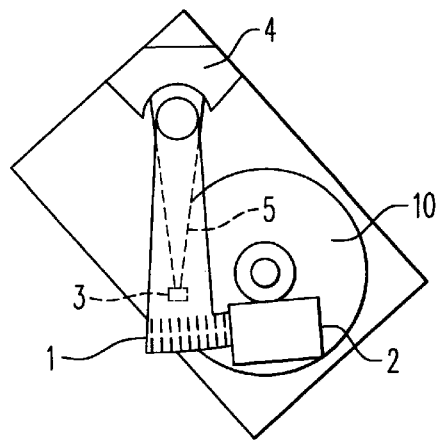
FIG. 3 is a schematic plan view of apparatus according to a first embodiment of the present invention.
Figure 4:
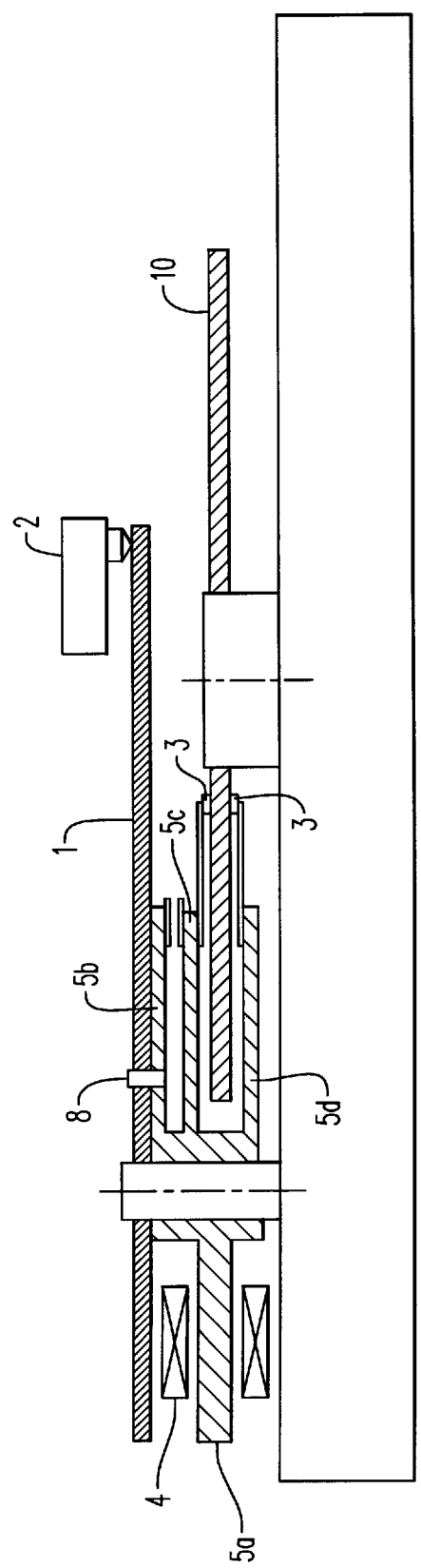
FIG. 4 is a side view partly in cross-section of the embodiment of FIG.3.
Figure 5:
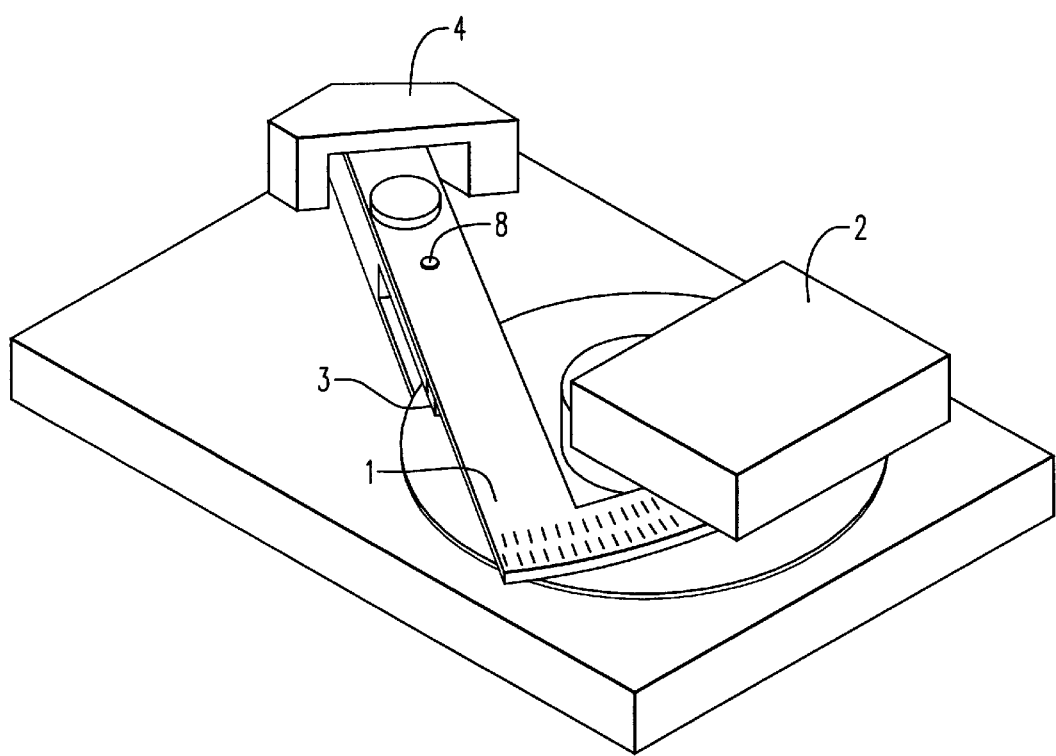
FIG. 5 is a perspective view of the embodiment of FIG. 3.

Referring firstly to FIG. 3, 4 and 5 there is shown a first embodiment of the invention comprising a grating member 1, a flat-type optical read head 2, servo write heads 3, a rotary actuator 4 and an actuator arm 5. As can be seen from FIG. 4 the hard disk 10 is rotatably mounted on disc spindle 9, while the grating member 1 and the actuator arm 5 are both rotatably mounted on actuator spindle 7. In this embodiment the read/write heads 3 of the hard disk assembly 6 themselves are used as the servo write heads.

The actuator arm 5 is conventional and comprises a first portion 5a on one side which is received between the actuating coils of rotary actuator 4 in a conventional manner. The second portion of the actuator arm is split into three mutually parallel portions: an upper portion 5b which is connected to the grating member 1 by means of a connection pin 8, and middle 5c and lower 5d portions that carry at their respective ends read/write heads 3 that are respectively located above and below the data carrying surfaces of the hard disk 10. The optical read head 2 is located above the grating member 1 and while the grating member 1 rotates with the actuator arm 5—and hence with the read/write heads 3—a laser focussed spot scans the scaling grating fixed to the top surface of the grating member 1 in a manner to be described below.

In this embodiment of the present invention the position tracking is configured as a closed-loop system. The arm bearing the read write heads 3, i.e. the actuator arm 5, is fixed to the grating member 1 (by connection pin 8) and the read/write heads are set on the middle span of the member 10. The heads 3 are thus directly set in the servo loop and therefore there is no slippage and warping and vibration of the servo write heads 3 is greatly reduced. The resolution of the system is increased by 60–100% in comparison with the prior art.

Figure 6:
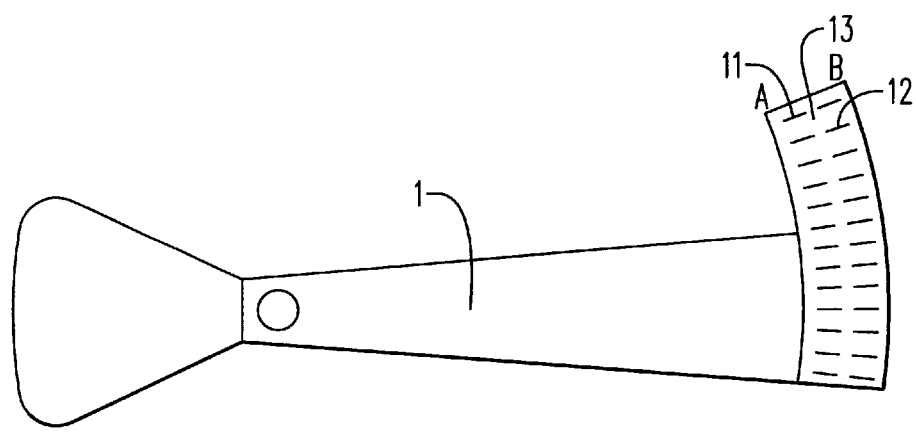
FIG. 6 is a view of a grating member.

The method and apparatus for controlling the position of the read/write heads is based on the principles of pending U.S. patent application Ser. No. 08/824,759 entitled "Auto Focus Laser Encoder" in the names of Lilong Cai and Jihua Zhang and the contents of which are hereby incorporated by reference. FIG. 6 shows the grating member 1 in more detail. The member is shaped as a fan-leaf so as to reduce the dynamic inertia to decrease the settling time of the servo write heads 3. The scaling grating is formed in an arcuate manner and consists of an inner grating 11 and an outer grating 12 separated by a smooth surface region 13. Each grating comprises alternating grooves and lands with widths close to the laser wavelength and with the depth of the grooves being equal to one quarter the laser wavelength. The smooth middle region 13 is used for reflecting an auto-focus spot as will be described below. The gratings can be formed by photolithography, preferably on a substrate material having excellent thermal stability, stiffness and lightness, for example polycarbonate resin.

Figure 7:
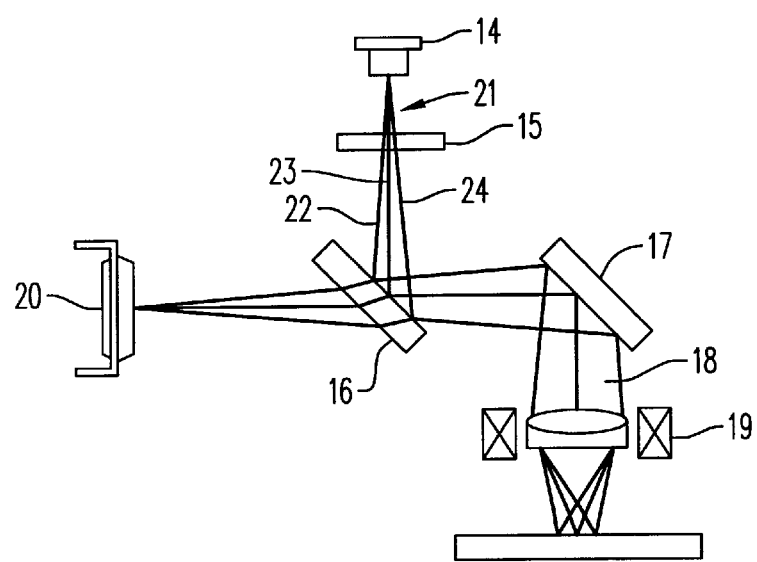
FIG. 7 shows the optical arrangement of the read head.

Any three-beam optical read head can be used in this embodiment of the present invention. A suitable flat-type read head is shown schematically in FIG. 7. A flat-type read head is preferred as it makes the resulting system more compact. The optical read head comprises a laser diode 14 as the light source, diffraction grating 15 which generates three beams as described below, beam splitter 16, mirror 17, objective lens 18, focussing actuator 19, and a six-segment photodetector 20. In use diffraction grating 15 splits an incident beam 21 emitted by the laser diode 14 into three beams 22,23,24. Beam splitter 16 directs beams 22,23,24 to the surface of the grating disk 1 by means of mirror 17 and objective lens 18, the objective lens being controlled by focus coil actuator 19, with the objective lens focussing the beams 22,23,24 into convergent cones of light, the convergence being a function of the numerical aperture (NA) of the lens 18.

The middle beam 23 is focussed onto the smooth middle region 13 of the grating and is used to maintain the focus within the focal depth. This can be achieved by one of many focus error detection methods which are capable of generating a focus error correction signal. In this embodiment of the present invention the six segment photodiode comprises four central quadrant segments that are used to generate a focus error signal. The two secondary or side beams 22,24 are focussed on the inner and outer sections of the grating respectively. The reflected beams are angled by the beam splitter 16 such that they are directed to the remaining outer segments of the six segment photodiode 20. Thus the central four segments of the photodiode 20 generate a focus error signal, while the two outer segments detect the intensities of the reflected secondary beams 22,24 from the inner 11 and outer 12 sections of the grating and output two corresponding intensity-modulated signals that are electrically 90° out of phase with each other. The focus error correction signal from the central four segments of the photodiode 20 is used to control the focus coil actuator 19 such that the actuator drives the objective lens 18 up and down as required with respect to the surface of the grating member 1 to maintain a constant distance from the surface so that the reading is independent of any shock or vibration to the surface, or any unevenness in the surface.

Figure 8B:
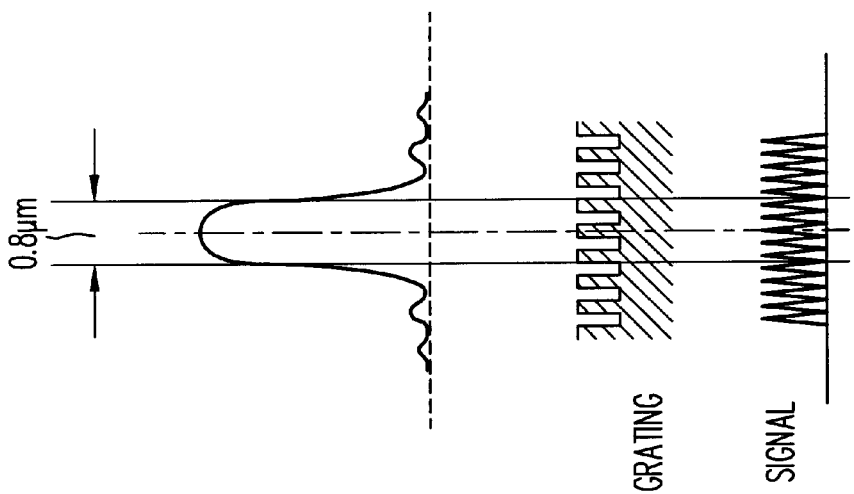
FIG. 8 illustrates the relationship between the focussed spot and the pitch of the grating.
Figure 8A:
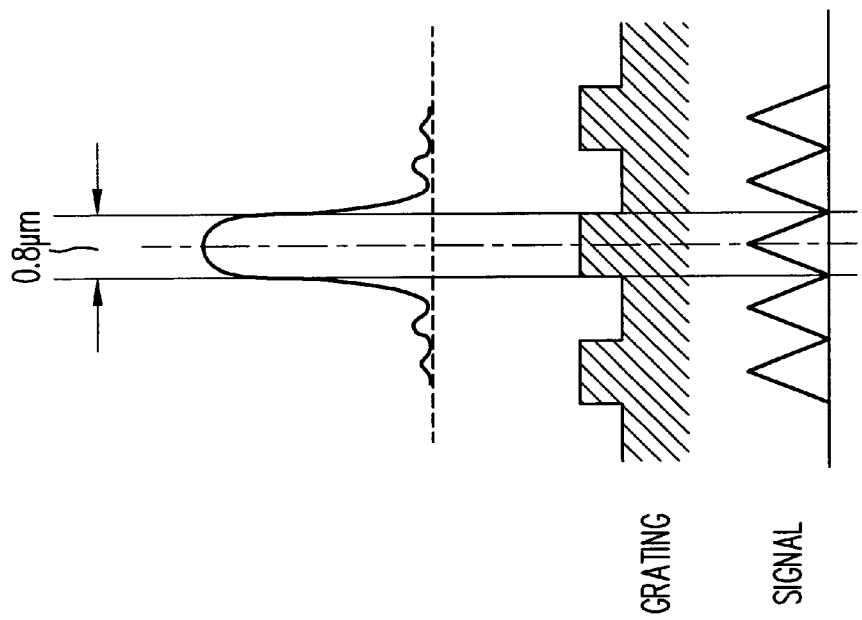

FIG. 8 illustrates what happens when the focussed beams are reflected from the gratings. In FIG. 8(*a*) it is assumed that the pitch of the scaling grating is about twice the diameter of the focussed spot. The laser spot diameter is typically specified as the point of half-intensity on the Airy pattern. The most light is reflected when the side spot strikes the middle of the lands or grooves. When the light strikes the edges of the lands and grooves the light intensity is reduced by the effect of interference since light reflected from the grooves travels $\lambda/2$ further than light reflected from the lands (because the grooves have a depth of $\lambda/4$) and the light from the grooves and the lands destructively interfere. If the light is reflected equally from a land and groove, there will be total cancellation and no light will be reflected. Thus as a spot scans along the grating the reflected light intensity is modulated by the grating pattern. The cycle of the intensity-modulated signal is half the pitch of the grating, and if the diameter of the spot is about the same as the width of a groove or land the signal achieves a continuous and smooth waveform with the greatest signal to noise ratio (SNR).

FIG. 8(*b*) considers the possibility that the diameter of the spot is a three times the grating pitch, i.e. an odd number. In such a situation, when the centre of the spot coincides with the middle of a land or groove, the light will always be reflected from either three lands and two grooves, or three grooves and two lands depending on whether the spot is centred on a land (three lands, two grooves) or a groove (three grooves, two lands). In either case although there will be some destructive interference causing cancellation, some light will still be reflected and these are the conditions of maximum reflected light intensity. Between these situations there will be points at which there is complete cancellation with zero light being received by the photodiode. Thus the output of the photodiode is also an intensity-modulated signal with a cycle of half the grating pitch, but in this case the maximum amplitude of the signal is reduced as more pitches of the grating are covered by a spot since there will always be some cancellation.

What FIGS. 8(*a*) and (*b*) show is that although by decreasing the grating pitch the resolution can be increased, this is at the price of reduced signal amplitude and thus a lower signal to noise ratio. There must therefore be a trade-off between the laser wavelength, grating pitch, desired resolution and desired SNR. For simplicity, if it is assumed that the light distribution in the spot is uniform, the resulting output signal will be a triangular wave as shown in FIG. 8. In practice, however, the light distribution will be Gaussian and the output signal approximately sinusoidal.

The output of the detectors is related to the pitch of the gratings. The inner and outer gratings 11,12 have the same angular interval or pitch and are displaced relative to each other by one eighth of this angular pitch. The cycle of the output signal—as shown with reference to FIG. 8 above—is half of the grating pitch, and this is the wavelength of the output signal. The two signals from the inner and outer gratings 11,12 are therefore 90° out of phase with each other which makes it possible to carry out quadrature decoding and to determine the direction of movement as is described in more detail in co-pending application Ser. No. 08/824, 759. For example, if the wavelength of the laser source is 0.6 $\mu$m and the numerical aperture of the objective lens is 0.85, the spot diameter will be 0.8 $\mu$m, and if the pitch of the grating is set at about 1.6 $\mu$m then a resolution of about 0.1 $\mu$m can be achieved without interpolation.

In most commercially available CD pickups the objective lens has a numerical aperture of about 0.55 and a laser diode of wavelength about 780 nm are used, giving a focussed spot of around 1.7 $\mu$m. In DVD techniques an objective lends with numerical aperture of about 0.65–0.85 and a laser diode wavelength of 600 nm have been adopted giving a spot size of 0.8 $\mu$m or less. Thus a conventional CD or DVD pickup head can be adapted as the optical read head for this invention. This allows existing technologies to be used and thus costs to be minimised.

Figure 9:
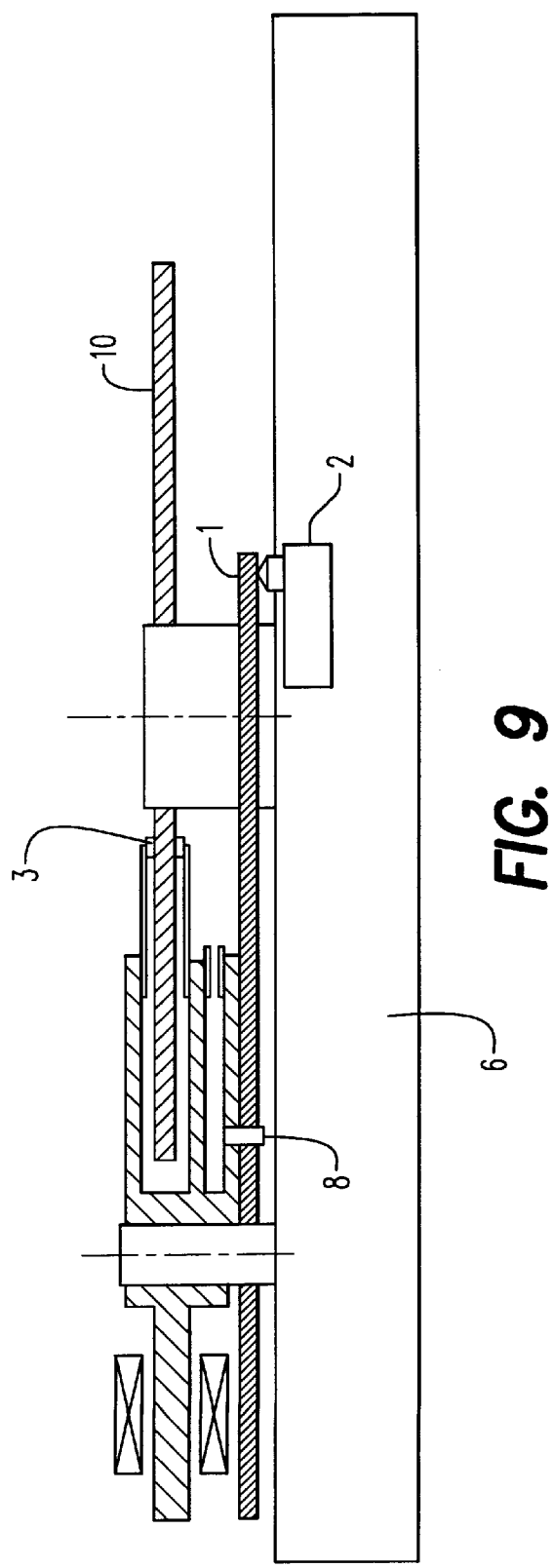
FIG. 9 is a view corresponding to FIG. 4 of a second embodiment of the invention.

FIG. 9 illustrates an alternative embodiment of the invention in which the grating member 1 is located between the actuator arm and the hard disk assembly body 6. The optical read head 2 is located underneath the grating member as part of the hard disk assembly body 6. This embodiment has the advantage of being more compact than the embodiment of FIGS. 3 to 8. As in the first embodiment, the grating member 1 and optical read head 2 can be used for accurate servo writing on the hard disk. However, it would also be possible to eliminate the servo pattern on the disk altogether and to use the present invention to directly monitor the position of the read/write heads during use of the hard disk. By eliminating the need to place a servo pattern on the hard disk an extra 6–10% of usable space is made available on the disk.

Thus the present invention, at least in its preferred forms, provides a high-resolution system in which the resolution depends on the pitch of the grating sections. A resolution of 0.1 $\mu$m or better can readily be achieved. The position system can be error-corrected in advance, for example, by means of a laser interferometer system, for greater accuracy. By positioning the write heads at a location midway along the span of the grating member the resolution of the system can be enhanced still further. Existing CD or DVD technology can be used for the production of the optical read head, while the grating sections can be formed using conventional photolithography techniques. Consequently the production costs of servo writers, and hence of the hard disks themselves, can be reduced. Furthermore since the optical read head and the grating sections are small, the overall apparatus is very compact.

The dynamic inertia of the grating member is small because of its shape, and so the settling time of the servo write head(s) is reduced and the servo writing time required is also reduced. This speeds up the hard disk manufacturing process. Because the servo write heads are set in the servo loop by being directly connected to the grating member and by using auto focussing, the apparatus is far less sensitive to vibration and no precise adjustment is required.

The position sensing system is sufficiently cheap, compact and accurate that it can in fact be incorporated directly into the hard disk assembly in place of a servo pattern, effectively increasing the disk space by 6–10%.

What is claimed is:

1. Apparatus for sensing the position and/or movement of at least one servo write head of a servowriter for a hard disk assembly, comprising: a grating member comprising at least two parallel reflection grating sections, an optical read head for reading position information of said grating member, and an actuator for driving together the grating member and said at least one servo write head.

2. Apparatus as claimed in claim 1 wherein said at least one servo write head is supported on an actuator arm and wherein said grating member is fixed to said actuator arm for movement therewith, said actuator arm being rotatably driven by said actuator about an axis.

3. Apparatus as claimed in claim 2 wherein said grating member has an elongate form with a grating formed at one end thereof, and wherein said at least one servo write head is located at a position approximately midway along said grating member between said axis and said grating.

4. Apparatus as claimed in claim 1 wherein said at least two parallel grating sections have identical pitch but are displaced relative to each other by one eighth of said pitch.

5. Apparatus as claimed in claim 4 wherein said two grating sections are separated by a smooth section for generating a focus error correction signal.

6. Apparatus as claimed in claim 5 wherein said actuator is a rotary actuator adapted to cause said servo write head and said grating member to rotate about an axis, and wherein said grating sections are arcuate with a center of curvature corresponding to the axis of rotation of said servo write head and said grating member.

7. Apparatus as claimed in claim 4 wherein said optical read head includes a laser light source and said grating sections comprise alternating lands and grooves, said grooves having a depth equal to one quarter the wavelength of the laser source.

8. Apparatus as claimed in claim 7 wherein said actuator is a rotary actuator adapted to cause said servo write head and said grating member to rotate about an axis, and wherein said grating sections are arcuate with a center of curvature corresponding to the axis of rotation of said read/write head and said grating member.

9. Apparatus as claimed in claim 4 wherein said actuator is a rotary actuator adapted to cause said servo write head and said grating member to rotate about an axis, and wherein said grating sections are arcuate with a center of curvature corresponding to the axis of rotation of said servo write head and said grating member.

10. Apparatus as claimed in claim 1 wherein said optical read head comprises a laser light source, means for dividing said laser light source into three beams, means for directing said three beams onto the surface of said grating member, means for detecting the beams reflected from said grating member, and means for outputting intensity-modulated signals corresponding to the motion of said grating member.

11. Apparatus as claimed in claim 1 wherein said at least one servo write head comprises a read/write head of the hard disk assembly.

12. Apparatus for sensing the position and/or movement of read/write heads of a hard disk assembly, comprising: a grating member fixedly connected to a read/write head, an optical head for reading position information of said grating member, and an actuator for driving together said grating member and said read/write head, and wherein said grating member comprises at least two parallel reflection grating sections.

13. Apparatus as claimed in claim 12 wherein said read/write head is supported on an actuator arm and wherein said grating member is fixed to said actuator arm for movement therewith, said actuator arm being rotatably driven by said actuator about an axis.

14. Apparatus as claimed in claim 13 wherein said grating member has an elongate form with a grating formed at one end thereof, and wherein said read/write head is located at a position approximately midway along said grating member between said axis and said grating.

15. Apparatus as claimed in claim 12 wherein said grating sections have identical pitch but are displaced relative to each other by one eighth of said pitch.

16. Apparatus as claimed in claim 15 wherein said two grating sections are separated by a smooth section for generating a focus error correction signal.

17. Apparatus as claimed in claim 16 wherein said actuator is a rotary actuator adapted to cause said read/write head and said grating member to rotate about an axis, and wherein said grating sections are arcuate with a center of rotation corresponding to the axis of rotation of said read/write head and said grating member.

18. Apparatus as claimed in claim 15 wherein said optical read head includes a laser light source and said grating sections comprise alternating lands and grooves, said grooves having a depth equal to one quarter the wavelength of the laser source.

19. Apparatus as claimed in claim 18 wherein said actuator is a rotary actuator adapted to cause said read/write head and said grating member to rotate about an axis, and wherein said grating sections are arcuate with a center of rotation corresponding to the axis of rotation of said read/write head and said grating member.

20. Apparatus as claimed in claim 15 wherein said actuator is a rotary actuator adapted to cause said read/write head and said grating member to rotate about an to axis, and wherein said grating sections are arcuate with a center of rotation corresponding to the axis of rotation of said read/write head and said grating member.

* * * * *